(12) United States Patent
Wu et al.

(10) Patent No.: US 9,811,421 B1
(45) Date of Patent: Nov. 7, 2017

(54) MANAGING MULTI-STEP STORAGE MANAGEMENT OPERATIONS BY USING FAULT RECOVERY POLICIES

(75) Inventors: RongZhang Wu, Shanghai (CN); Xuan Tang, Hopkinton, MA (US); Yifan Wang, Shanghai (CN); Yiyang Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1253 days.

(21) Appl. No.: 13/076,594

(22) Filed: Mar. 31, 2011

(51) Int. Cl.
*G06F 11/14* (2006.01)
*G06F 11/07* (2006.01)
*G06F 9/48* (2006.01)

(52) U.S. Cl.
CPC .......... *G06F 11/1402* (2013.01); *G06F 9/485* (2013.01); *G06F 11/07* (2013.01); *G06F 11/14* (2013.01)

(58) Field of Classification Search
CPC ...... G06F 11/1402; G06F 9/485; G06F 11/07; G06F 11/14
USPC ...... 711/154, 161, 162; 714/2, 6.1–6.32, 51; 718/100
See application file for complete search history.

(56) References Cited

U.S. PATENT DOCUMENTS

| 8,244,685 | B2* | 8/2012 | Fiske | 707/663 |
| 8,266,477 | B2* | 9/2012 | Mankovskii | G06F 11/0709 714/15 |
| 2003/0105988 | A1* | 6/2003 | Shanbhogue | G06F 8/65 714/6.3 |
| 2004/0204949 | A1* | 10/2004 | Shaji et al. | 705/1 |
| 2004/0215997 | A1* | 10/2004 | Anderson et al. | 714/2 |
| 2004/0260899 | A1* | 12/2004 | Kern et al. | 711/162 |
| 2008/0178181 | A1* | 7/2008 | Gulick | 718/102 |
| 2009/0300633 | A1* | 12/2009 | Altrichter | G06F 11/1461 718/103 |
| 2010/0082925 | A1* | 4/2010 | Irisawa et al. | 711/162 |
| 2010/0293407 | A1* | 11/2010 | Locasto et al. | 714/2 |
| 2010/0306486 | A1* | 12/2010 | Balasubramanian et al. | 711/162 |
| 2011/0246822 | A1* | 10/2011 | Little | G06F 9/466 714/16 |
| 2011/0296133 | A1* | 12/2011 | Flynn | G06F 11/1048 711/171 |

\* cited by examiner

*Primary Examiner* — Arpan P. Savla
(74) *Attorney, Agent, or Firm* — Krishnendu Gupta; Deepika Bhayana

(57) ABSTRACT

A method is used in managing multi-step storage management operations. A policy is defined for a task of a multi-step storage management operation. The multi-step storage management operation includes multiple tasks. The policy for the task indicates directions for reacting to results of the task of the multi-step storage management operation. The task is invoked. The policy for the task is invoked based on results of the task.

20 Claims, 7 Drawing Sheets

MANAGING MULTI-STEP STORAGE MANAGEMENT OPERATIONS BY USING FAULT RECOVERY POLICIES

BACKGROUND

Technical Field

This application relates to managing multi-step storage management operations.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. RAID (Redundant Array of Independent or Inexpensive Disks) parity schemes may be utilized to provide error detection during the transfer and retrieval of data across a storage system (also known as storage arrays or arrays).

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application.

For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

Multiple operations provide a convenient mechanism whereby multiple method invocations may be batched into a single HTTP Message, thereby reducing the number of roundtrips between a CIM client and a CIM server and allowing the CIM server to make internal optimizations. Multiple operations do not confer any transactional capabilities in the processing of the request (for example, there is no requirement that the CIM server guarantee that the constituent method calls either all failed or all succeeded, only that the entity make a "best effort" to process the operation). However, servers process each operation in a batched operation to completion before executing the next operation in the batch.

In general, tasks such as assigning a LUN from a disk storage system to a host, and adding a LUN to a disk storage system, can be complex to execute. Other example tasks may include otherwise allocating storage, specifying the logical and/or physical devices used for the storage allocation, specifying whether the data should be replicated, the particular RAID level, and the like.

SUMMARY OF THE INVENTION

A method is used in managing multi-step storage management operations. A policy is defined for a task of a multi-step storage management operation. The multi-step storage management operation includes multiple tasks. The policy for the task indicates directions for reacting to results of the task of the multi-step storage management operation. The task is invoked. The policy for the task is invoked based on results of the task.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
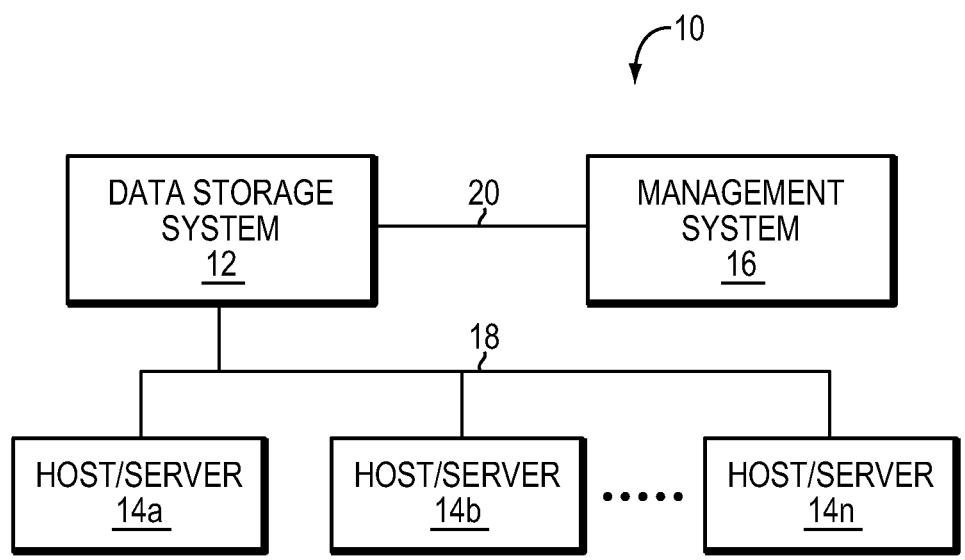
FIG. 1 is an example of an embodiment of a computer system that may utilize the techniques described herein.

Described below is a technique for use in managing multi-step storage management operations, which technique may be used to help provide for, among other things, defining a policy for a task of a multi-step storage management operation and based on results of the task of the multi-step storage management operation, invoking the policy for the task.

Conventionally, traditional storage system management software requires storage administrators to perform a set of discrete tasks to accomplish array management operations. In such a conventional system, in order to perform the set of discrete tasks, a generic transaction service is provided that bundles a set of discrete CIM based management tasks together, and automatically execute the bundle asynchronously as an inseparable entity. A typical multi-step storage management operation (also referred to as "management operation" or a "job") conventionally includes many discrete tasks, and can potentially fail before the final task is finished, which can leave the storage system improperly configured. As storage venders continue to introduce more advanced features into storage systems, it also introduces complexity to storage management. In such a conventional system, the generic transaction server treats a set of discrete CIM tasks as a single transaction, while maintaining the status and progress of the transaction. Further, in such a conventional system, the generic transaction server performs automatic rollback to undo finished tasks of a multi-step storage management operation, e.g., if any irresolvable errors occur prior to the completion of the multi-step storage management operation. Conventionally, during execution of a management operation, any one of discrete tasks from the set of discrete tasks may fail as a result of a change in a condition of the storage array leaving the storage array in an erroneous state (e.g. crash, reboot). Conventionally in such a system, the entire set of discrete tasks are rolled back. However, in such a conventional system, if a task of a management operations fails, the management operation is rolled back. In such a conventional system, when the storage system restarts, the task of the management operation is executed again and may cause the storage system to fail repeatedly if a problem causing the task to fail is not resolved.

By contrast, in at least some implementations in accordance with the technique as described herein, providing a configurable policy based fault recovery framework that allows a user to define a fault recover action for each task of a multi-step storage management operation enables the user to recover from a failure that may occur as a result of executing the multi-step storage management operation.

In at least some implementations in accordance with the technique as described herein, the use of the managing multi-step storage management operations can provide one or more of the following advantages: improving data storage system performance by avoiding repeated failures in the data storage system, and increasing system availability by recovering from a failure efficiently.

In at least one example implementation in accordance with the technique, the generic transaction service contains at least three logical components: a hierarchical task framework from which multi-step tasks can be derived, a policy framework that allows a user to programmatically define fault recovery policies for each task of a multi-step storage management operation and an execution engine that drives and executes the business logic of tasks. In the example implementation, the execution engine understands the abstraction of management tasks, providing a generic and adaptable framework for any storage management software, and the execution engine persists the content and status of each transaction based tasks. In at least one embodiment of the current technique, the framework is extendable and programmable, to provide flexible control of dependencies of tasks included in a management operation.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In at least one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage system management tasks such as related to data storage system configuration, provisioning of data storage, and the like. However, the described applications and implementations are only examples; the techniques herein may be adaptable to other applications and/or to the particular knowledge level of the user.

Figure 2:
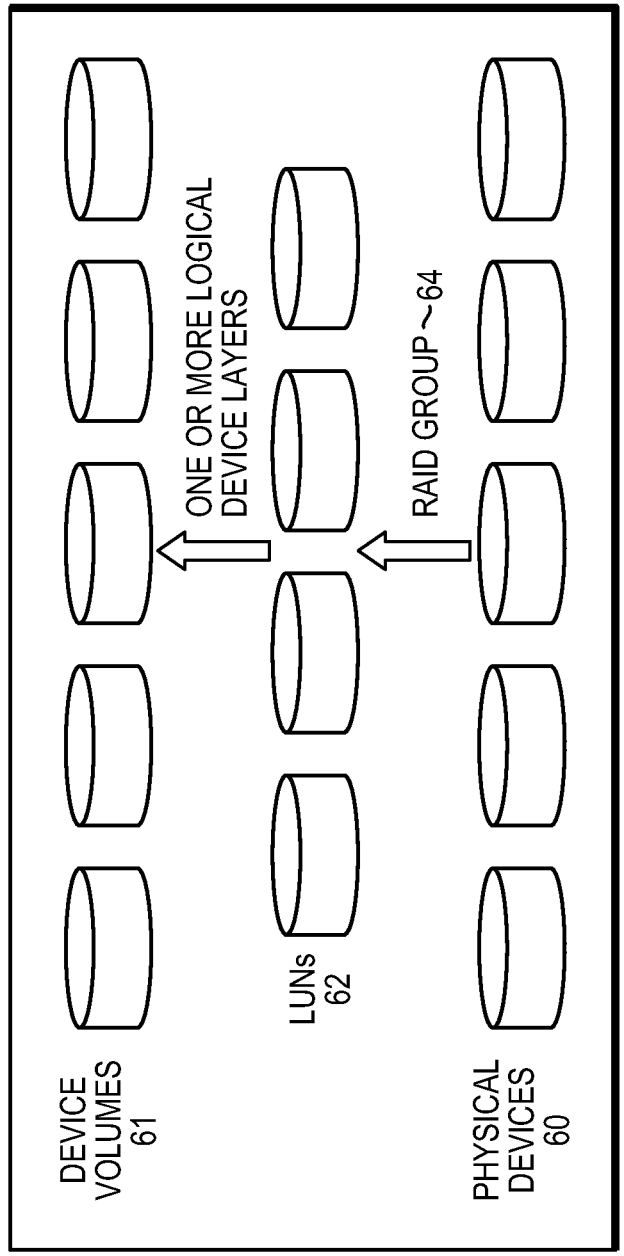
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

Figure 3:
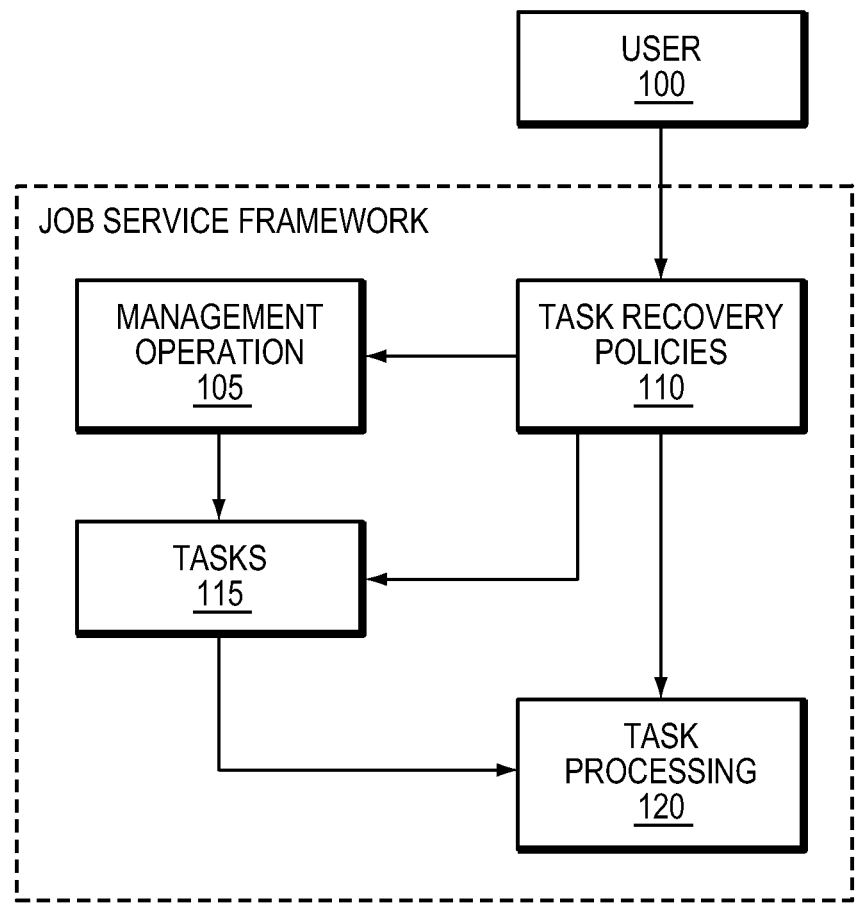
FIGS. 3 and 4 are diagrams illustrating in more detail components that may be used in connection with techniques herein.

Referring to FIG. 3, shown is a detailed representation of components that may be included in an embodiment using the techniques described herein. In at least one embodiment of the current technique, a policy based fault recovery framework enables a user to create a recovery policy for each task of a multi-step management operation. If a task of the multi-step storage management operation fails, the recovery policy for the task is executed and a recovery action associated with the recovery policy is performed. Further, the policy based fault recovery framework enables a user to define a recovery policy for a multi-step storage management operation and associate a recovery action with the recovery policy. When the multi-step storage management operation resumes execution after the failure of a task, the recovery action associated with the recovery policy for the multi-step storage management operation is executed. In at least one embodiment, recovery policies for tasks may be defined programmatically by a user. Further, recovery policies for tasks may also be defined by a user by using a remote user interface (such as a command line interface or a graphical user interface).

In at least one embodiment, user 100 defines recovery policies 110 for multi-step storage management operation 105 and each task 115 of the multi-step storage management operation 105. Management operation 105 is then executed by a job service framework where each task of the management operation 105 is executed by task processing logic 120. If a task of the management operation 105 fails, the recovery action associated with the recovery policy for the task is executed. If management operation 105 resumes from a persistent storage after a failure of a task or a system crash, the recovery action associated with the recovery policy for the management operation 105 is executed.

The current technique may be used not only in a data storage provisioning environment or towards ease of use but also in any situation in which management operations need to be executed in an orderly, step by step, transactional fashion to achieve a particular result.

Figure 4:
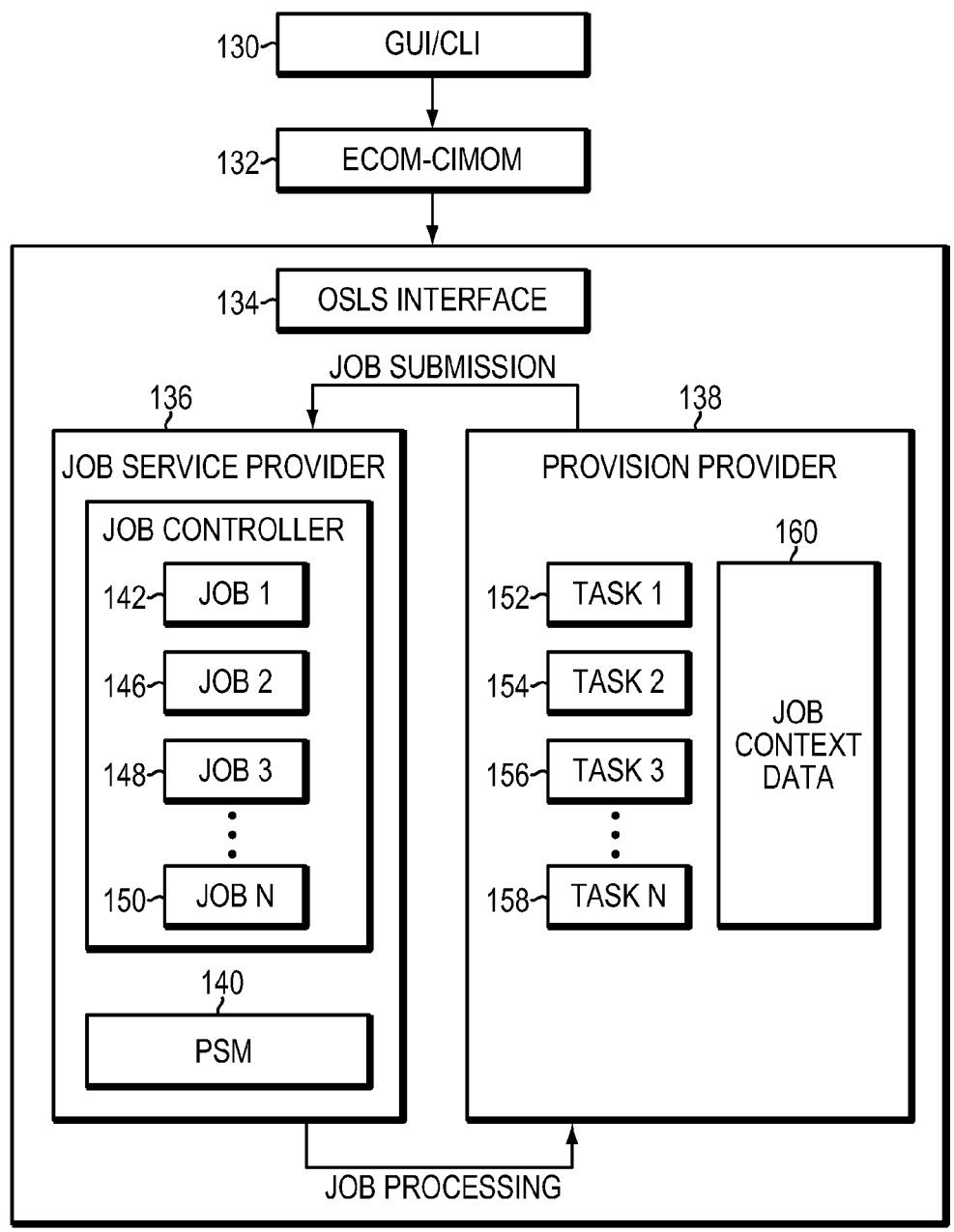

Referring to FIG. 4, shown is a more detailed representation of components that may be included in an embodiment using the techniques described herein. In at least one embodiment, UI 130 may provide for one or more different types of user interfaces and associated data. For example, the UI 130 may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. Each of the different user levels may provide a different level of detail with respect to the underlying operations and tasks performed on the data storage system in accordance with different levels of user sophistication and knowledge. Thus, a user may interact with the data storage system at a variety of different levels when issuing data storage management operations. A storage management software application may use a CIM client to connect to a CIMOM 132, to retrieve information about the storage entities that the CIMOM manages, and also to perform active configuration of the storage entities. Storage management software that uses a CIM client may be called a CIM client application that may be accessed by UI 130. A user issues a storage management operation using UI 130, which in turns, sends a request to CIMOM 132. OSLS (Open Storage Layer Sharp) 134 is an object-oriented, cross-platform C++ API for developing management applications that can interact with storage resources, such as storage devices, switches, servers, and the like. PSM (Persistent Storage Manager) 140 is a mechanism that enables the data storage system to read and/or write shared persistent files from a storage processor of the data storage system. Job service provider 136 is an OSLS compatible framework for provision provider 138 to submit asynchronous jobs. Job service provider 136 manages and process asynchronous jobs (also referred to as multi-step storage management operation) submitted by provision provider 138. An asynchronous job includes a series of small execution units that may be processed in sequence. An asynchronous job may be rolled back or stopped when a failure occurs based on a recovery policy of each execution unit of the asynchronous job. An execution unit of a job is represented by a task. A task is defined and created by provision provider 138 and an external client of the data storage system may be unaware of the task. A job context data 160 is defined to represent internal common data that may be updated and shared among the execution units of a job. The job context data 160 is accessible to each execution unit ("task") of a job as the input and/or output parameters when the job is processed by provision provider 138.

A generic "ToDo" object (also referred to as TODO object) carries out the transactions of storage management operations. The implementation divides one storage management operation into a set of discrete tasks, and encapsulates them into a TODO object. When a storage management operation is initiated, the provision provider 138 creates a TODO object and immediately saves it in persistent storage.

If execution of a TODO object encounters any unrecoverable errors, the provision provider 138 rolls back to remove temporary objects created before finishing the storage management operation. If the CIMOM 132 crashes during the operation, after the CIMOM restarts, the provision provider 138 loads the TODO object into memory and automatically starts to execute unfinished operations. With respect to error handling of a storage management operation, depending on a recovery policy for each task of the storage management operation, the provision provider 138 takes different recovery actions. A goal of error handling is to make the process opaque to the user. In particular, the entire process should either succeed or fail without leaving any temporary objects.

In some embodiments, a user sends a request from UI 130 to the provision provider 138 to execute a storage management operation. Provision provider 138 validates the request from the user and creates a list of tasks for the storage management operation. Provision provider 138 creates a TODO object corresponding to the storage management operation and provides information to job service provider 136. Job service provider 136 then executes the storage management operation synchronously in the background.

For example, in FIG. 4, job service provider executes jobs 142-150 and each job may be associated with list of tasks (e.g., job 1 142 includes tasks 152-158. A storage management operation may be stored in a persistent storage by PSM 140 enabling the storage management operation to resume when CIMOM 132 reboots or restarts.

Figure 5:
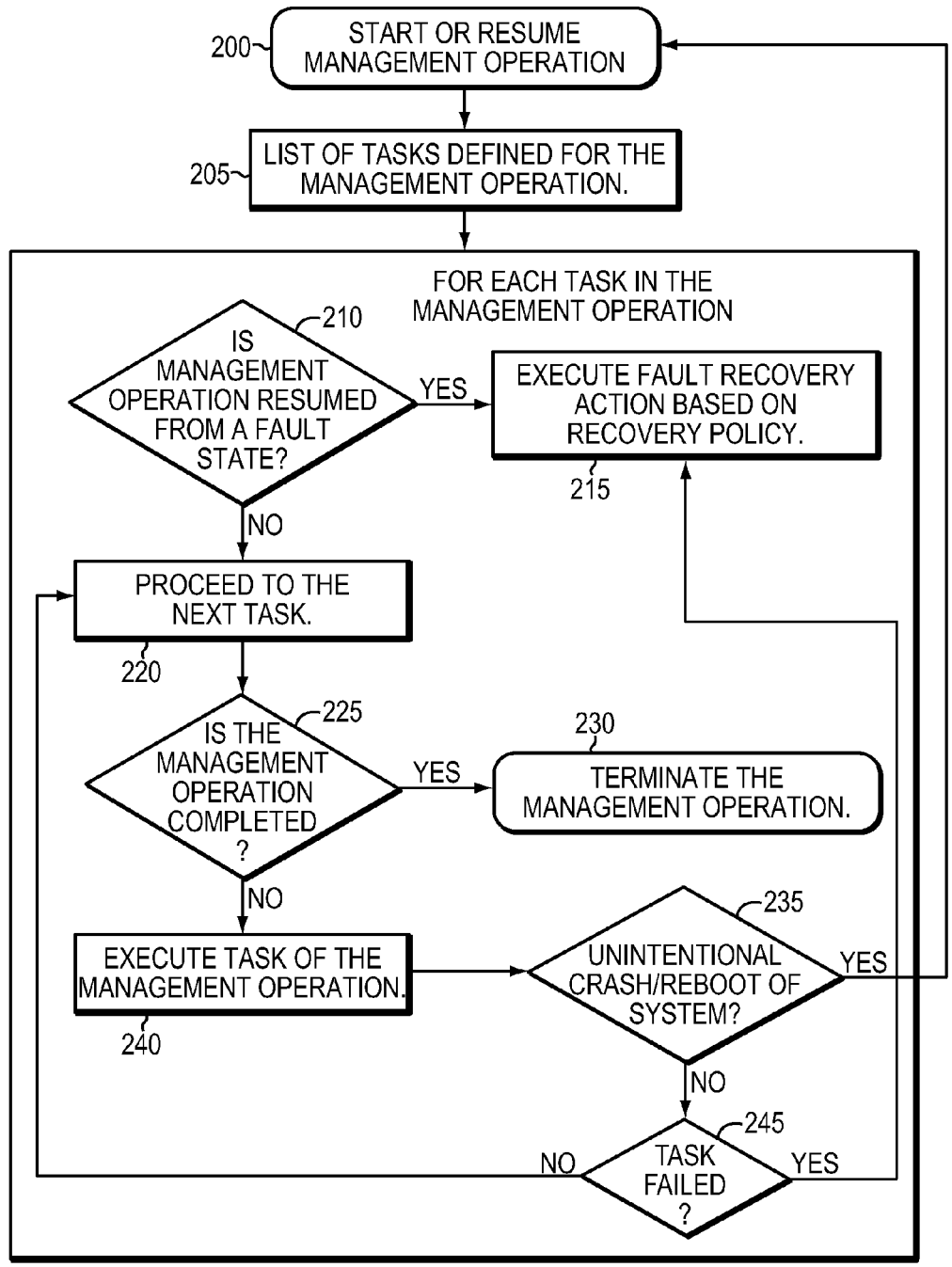
FIGS. 5 and 6 are flow diagrams illustrating process that may be used in connection with techniques herein.

Referring to FIG. 5, shown is a flow diagram illustrating a flow of data in the data storage system. With reference also to FIGS. 3 and 4, a user creates a fault recovery policy for a multi-step storage management operation and a fault recovery policy for each task of the multi-step storage management operation. The multi-step storage management operation is submitted to job service provider 136 for execution (step 200). Job service provider 136 works in conjunction with provision provider 138 that defines a list of tasks for the multi-step storage management operation (step 205). Provision provider 138 executes each task of the multi-step storage management operation (step 240). If CIMOM 132 crashes during the execution of the multi-step storage management operation or if any task of the multi-step storage management operation fails, the provision provider 138 resumes the multi-step storage management operation to execute unfinished tasks (step 210). When the multi-step storage management operation is resumed after a failure, a crash occurs or the storage system reboots, the fault recovery action associated with the fault recovery policy defined for the multi-step storage management operation is executed (step 215). If the management operation is not resumed after a failure, the next task from the list of tasks for the management operation is selected for execution (step 220). If every task of the multi-step storage management operation is executed (step 225), the management operation is terminated successfully (step 230). If a task of the management operation fails (step 245), the fault recovery action associated with the fault recovery policy defined for the task is executed (step 215).

Figure 6:
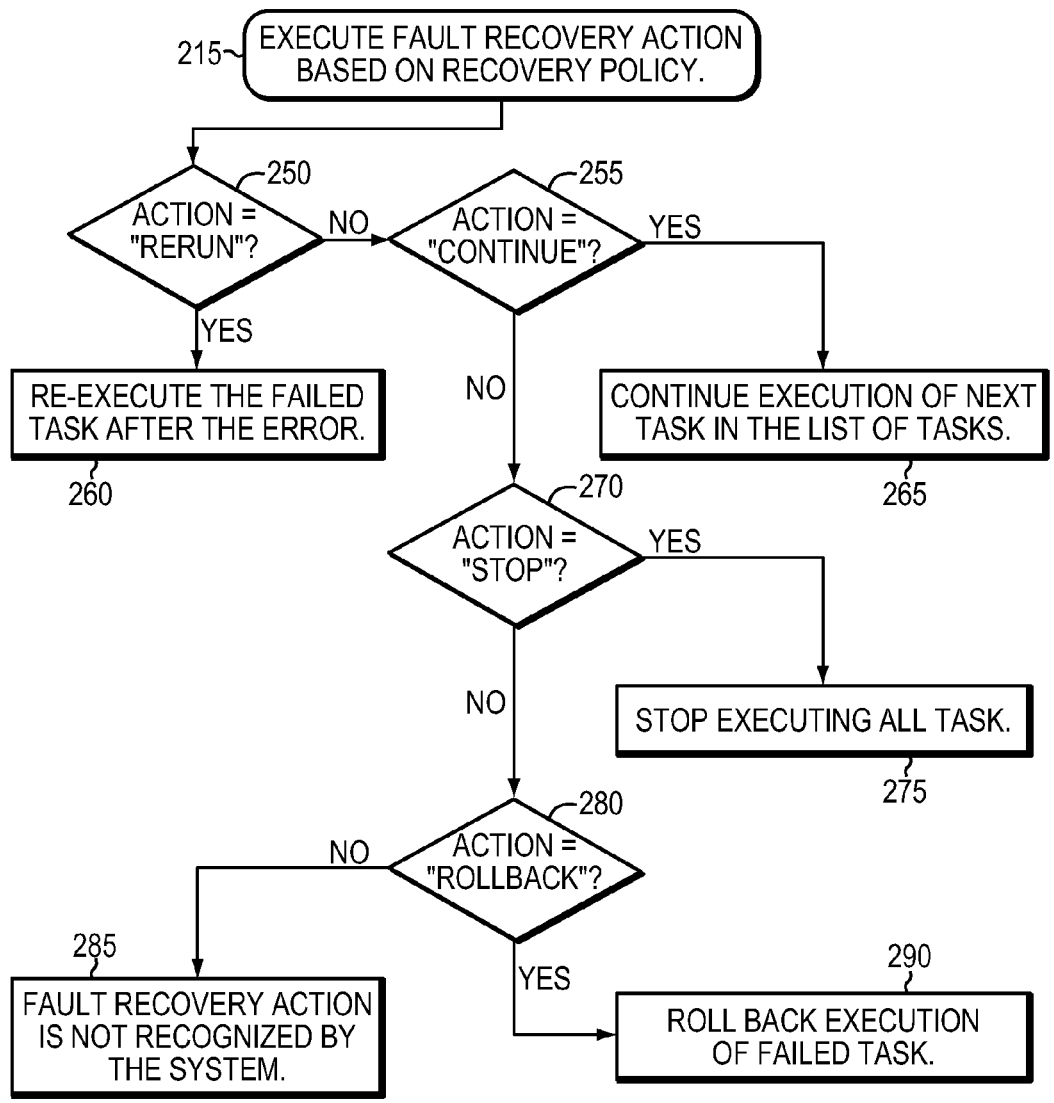

Referring to FIG. 6, shown is a detailed flow diagram illustrating a flow of data in the data storage system. A recovery action associated with a recovery policy for a task from a list of tasks associated with a management operation indicates instructions (e.g., "re-run", "continue", "roll back" and "stop on error") regarding how to react when the task fails. If the recovery action for a task indicates "rerun" (step 250), the task is executed again after encountering a failure (step 260). If the recovery action for a task indicates "continue" (step 255), the next task in the list of tasks associated with the management operation is executed (step 265). If the recovery action for a task indicates "stop" (step 270), execution stops for the storage management operation (step 275). If the recovery action for a task indicates "rollback" (step 280), the task is rolled back after encountering a failure. Rollback of a management operation or a task may be accomplished in any of multiple different ways. In at least one implementation, partial or complete rollback is achieved incrementally by reversing each step of a management operation in order starting with the most recently completed task. If the recovery action for a task does not indicate instructions that may be performed by job service provider 136, no fault recovery action is performed for the task (step 285).

Figure 7:
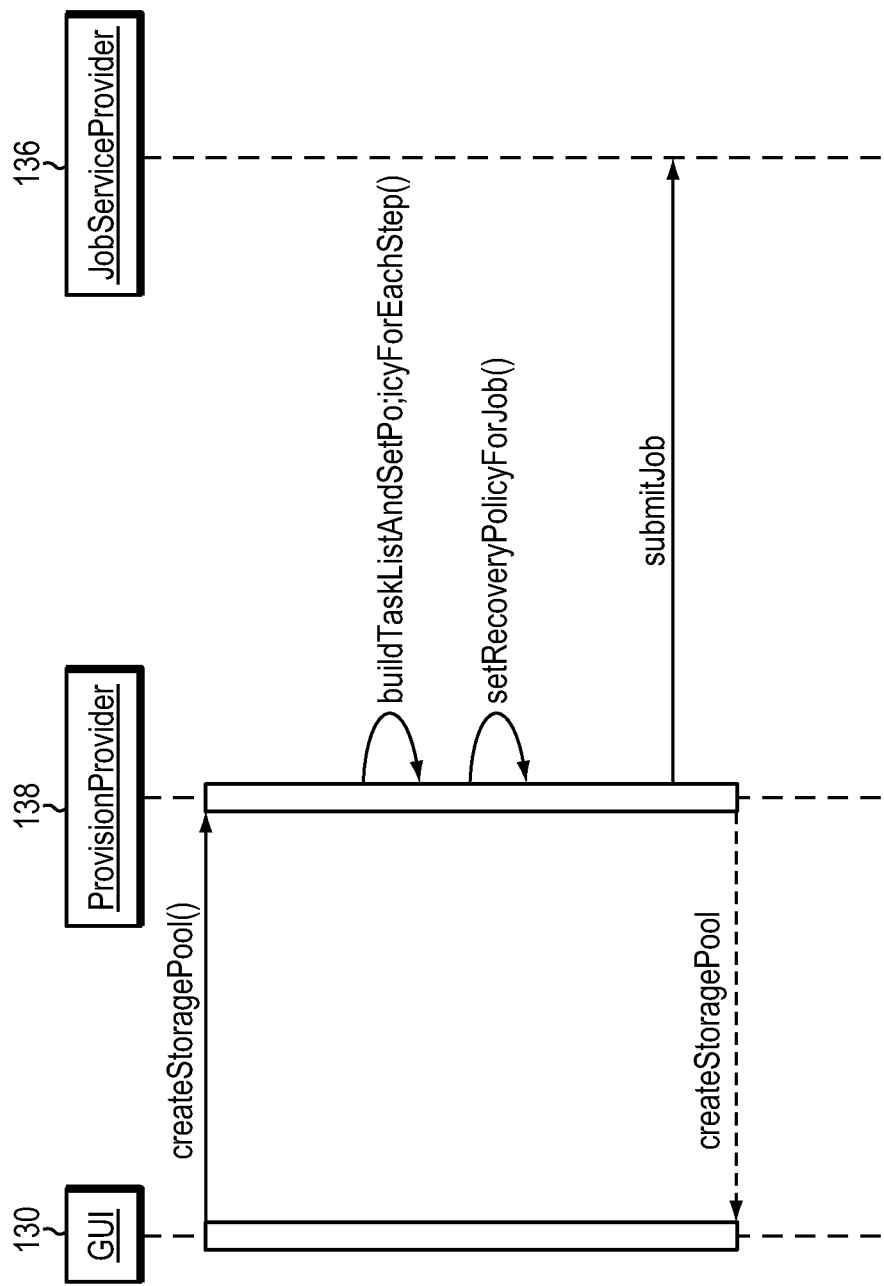
FIG. 7 is a diagram illustrating an example of sequence of events that may be used in connection with techniques herein.

Referring to FIG. 7, shown is one example of execution of a multi-step storage management operation that may be included in an embodiment using the techniques described herein. With respect to storage pool creation and an example of using the policy based fault recovery framework, the following uses storage pool creation as an example to give a high level description of how the policy based fault recovery framework can be used to carry out storage management operations. With reference also to FIGS. 3 and 4, UI 130 sends a request to provision provider 138 for creating a storage pool. Provision provider 138 divides the operation of creating a storage pool into multiple steps, builds a task for each step, sets a recovery policy for the operation and each task, and bundles multiple tasks into a job. Provision provider 138 then submits the job to job service provider 136. Job service provider 136 executes the job in background and performs the recovery policy when a failure occurs. For example, the following are tasks executed to accomplish the creation of a storage pool.

An empty storage pool is created. After the storage pool is created, it is immediately represented to the user in the user interface (UI) 130. UI 130 has a progress indicator showing that work is in progress to construct the pool.

1. A disk pool is created with a set of disks. Once disks are added to the disk pool, they are excluded from being used by user to create public RAID groups.
2. Internal private RAID groups are created.
3. A set of private LUNs are created. A private LUN is a LUN that is not visible to a user and is used by a data storage system internally for creating a set of private LUNs. Provision provider 138 binds the set of private LUNs to the private RAID groups. Binding LUN is an asynchronous operation. Provision provider 138 kicks off all the bind requests and waits until all LUNs become available before moving to the next step.
4. Once all LUNs from the set of private LUNs are bound, the provision provider add the set of private LUNs to the storage pool.
5. After all LUNs from the set of private LUNs are added to the storage pool, provision provider 138 sends a request to activate all LUNs from the set of private LUNs.
6. Once all LUNs from the set of private LUNs are activated, the provider deletes the Todo object associated with the storage creation operation to release resources consumed by the object.

Each of the task described above is associated with a fault recovery policy in such a way that upon failure of a task, the fault recovery policy associated with the task is executed.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing multi-step storage management operations, the method comprising:
   receiving a request to execute a multi-step storage management operation, wherein the multi-step storage management operation is comprised of a set of discrete tasks, wherein the set of discrete tasks are bundled together and executed asynchronously, wherein upon failure of a discrete task, a fault recovery policy for the discrete task is invoked;
   using a fault recovery policy framework to enable a user to recover from a failure occurred during execution of the multi-step storage management operation by programmatically defining a set of fault recovery policies for the set of discrete tasks included in the multi-step storage management operation, each fault recovery policy of the set of fault recovery policies being associated with a discrete task of the set of discrete tasks, wherein a fault recovery policy for a discrete task of the set of discrete tasks indicates directions for reacting to results of the discrete task of the multi-step storage management operation, wherein reacting to the results of the discrete task includes a set of recovery actions for recovering from a failure;

invoking each discrete task of the set of discrete tasks upon receiving the request to execute the multi-step storage management operation;

based on results of each discrete task of the set of discrete tasks, invoking a fault recovery policy from the set of fault recovery policies for recovering from a failure occurred upon invoking a discrete task during execution of the multi-step storage management operation, wherein the fault recovery policy is associated with the discrete task, wherein the fault recovery policy is invoked upon determining that the discrete task has failed to complete during execution of the multi-step storage management operation; and based on the invocation of the fault recovery policy, performing a recovery action associated with the fault recovery policy upon resuming the execution of the multi-step storage management operation after the failure of the discrete task of the multi-step storage management operation, wherein a recovery action includes a continue action, a re-run action, stop on error action, and a rollback action.

2. The method of claim 1, wherein a recovery action is associated with a fault recovery policy.

3. The method of claim 2, wherein invoking the fault recovery policy for the discrete task further comprising performing the recovery action associated with the policy for the discrete task.

4. The method of claim 1, further comprising defining a policy for the multi-step storage management operation.

5. The method of claim 1, further comprising:
performing a recovery action associated with a policy for the multi-step storage management operation upon failure of the multi-step storage management operation.

6. The method of claim 1, further comprising:
performing a recovery action associated with a fault recovery policy for a discrete task of the set of discrete tasks of the multi-step storage management operation upon failure of the discrete task of the multi-step storage management operation.

7. The method of claim 1, further comprising:
creating a set of discrete tasks for the multi-step storage management operation; and
executing each discrete task of the set of discrete tasks for the multi-step storage management operation.

8. The method of claim 1, wherein a fault recovery policy for a discrete task is defined programmatically by a user.

9. The method of claim 1, further comprising storing information for the multi-step storage management operation in a persistent storage.

10. The method of claim 1, further comprising:
performing a recovery action associated with a policy for the multi-step storage management operation upon resuming the execution of the multi-step storage management operation after a failure of a discrete task of the multi-step storage management operation by using information stored in a persistent storage.

11. A system for use in managing multi-step storage management operations, the system comprising a processor configured to:
receive a request to execute a multi-step storage management operation, wherein the multi-step storage management operation is comprised of a set of discrete tasks, wherein the set of discrete tasks are bundled together and executed asynchronously, wherein upon failure of a discrete task, a fault recovery policy for the discrete task is invoked;

use a fault recovery policy framework to enable a user to recover from a failure occurred during execution of the multi-step storage management operation by programmatically defining a set of fault recovery policies for the set of discrete tasks included in the multi-step storage management operation, each fault recovery policy of the set of fault recovery policies being associated with a discrete task of the set of discrete tasks, wherein a fault recovery policy for a discrete task of the set of discrete tasks indicates directions for reacting to results of the discrete task of the multi-step storage management operation, wherein reacting to the results of the discrete task includes a set of recovery actions for recovering from a failure;

invoke each discrete task of the set of discrete tasks upon receiving the request to execute the multi-step storage management operation;

invoke, based on results of each discrete task of the set of discrete tasks, a fault recovery policy from the set of fault recovery policies for recovering from a failure occurred upon invoking a discrete task during execution of the multi-step storage management operation, wherein the fault recovery policy is associated with the discrete task, wherein the fault recovery policy is invoked upon determining that the discrete task has failed to complete during execution of the multi-step storage management operation; and perform, based on the invocation of the fault recovery policy, a recovery action associated with the fault recovery policy upon resuming the execution of the multi-step storage management operation after the failure of the discrete task of the multi-step storage management operation, wherein a recovery action includes a continue action, a re-run action, stop on error action, and a rollback action.

12. The system of claim 11, wherein a recovery action is associated with a fault recovery policy.

13. The system of claim 12, wherein invoking the fault recovery policy for the discrete task further comprising:
perform the recovery action associated with the policy for the task.

14. The system of claim 11, further comprising:
define a policy for the multi-step storage management operation.

15. The system of claim 11, further comprising:
perform a recovery action associated with a policy for the multi-step storage management operation upon failure of the multi-step storage management operation.

16. The system of claim 11, further comprising:
perform a recovery action associated with a fault recovery policy for a discrete task of the set of discrete tasks of the multi-step storage management operation upon failure of the discrete task of the multi-step storage management operation.

17. The system of claim 11, further comprising:
create a set of discrete tasks for the multi-step storage management operation; and
execute each discrete task of the set of discrete tasks for the multi-step storage management operation.

18. The system of claim 11, wherein a fault recovery policy for a discrete task is defined programmatically by a user.

19. The system of claim 11, further comprising:
store information for the multi-step storage management operation in a persistent storage.

20. The system of claim 11, further comprising:
perform a recovery action associated with a policy for the multi-step storage management operation upon resuming the execution of the multi-step storage management operation after a failure of a discrete task of the multi-step storage management operation by using information stored in a persistent storage.

* * * * *